US006947582B1

(12) United States Patent
Vilsmeier et al.

(10) Patent No.: US 6,947,582 B1
(45) Date of Patent: Sep. 20, 2005

(54) THREE-DIMENSIONAL SHAPE DETECTION BY MEANS OF CAMERA IMAGES

(75) Inventors: Stefan Vilsmeier, Kufstein (AT); Rainer Birkenbach, Poing (DE)

(73) Assignee: BrainLAB AG, Kirchheim/Heimstetten (DE)

( * ) Notice: Subject to any disclaimer, the term of this patent is extended or adjusted under 35 U.S.C. 154(b) by 506 days.

(21) Appl. No.: 09/662,045

(22) Filed: Sep. 15, 2000

(30) Foreign Application Priority Data

Sep. 16, 1999 (DE) ................................ 199 44 516

(51) Int. Cl.[7] ................................................ G06K 9/00
(52) U.S. Cl. ...................... 382/128; 382/154; 382/199; 382/203; 606/130; 345/419; 600/415
(58) Field of Search ................................ 382/128, 131, 382/154, 203, 285, 199; 600/414, 415, 426, 600/443, 109, 173; 606/130; 345/419

(56) References Cited

U.S. PATENT DOCUMENTS 5,151,609 A * 9/1992 Nakagawa et al. .... 250/559.22
5,305,092 A * 4/1994 Mimura et al. ............. 356/609
5,381,236 A * 1/1995 Morgan ...................... 356/609
6,006,126 A * 12/1999 Cosman ...................... 600/426
6,088,099 A * 7/2000 Cabib et al. ................ 356/456

OTHER PUBLICATIONS

"Shape from Focus: An Effective Approach for Rough Surfaces" by Nayar et al. Robotics and Automation, 1990. Proceedings., 1990 IEEE International Conference on , May 13-18, 1990. pp.: 218-225 vol. 2.*

* cited by examiner

*Primary Examiner*—Jon Chang
*Assistant Examiner*—Charles Kim
(74) *Attorney, Agent, or Firm*—Renner, Otto, Boisselle & Sklar, LLP

(57) ABSTRACT

A method of detecting the shape of an object comprises the following steps: a) producing a camera image of the object; b) mapping an outline of the object, which appears sharp in the camera image, in a first plane by means of an analyzer connected to the camera; c) altering the focusing distance of the camera; d) mapping a sharp outline of the object in a second plane by means of the analyzer; e) repeating steps b) to d) until a sufficient number of outlines has been mapped so that the three-dimensional shape of the object can be established. Also disclosed is an apparatus for implementing the method.

12 Claims, 1 Drawing Sheet

THREE-DIMENSIONAL SHAPE DETECTION BY MEANS OF CAMERA IMAGES

BACKGROUND OF THE INVENTION

1. Technical Field

The present invention relates to a method and an apparatus for detecting the shape of an object.

In many applications it is important to precisely know the outer shape of an object. One such application is, for example, in the field of medical technology. Patients are scanned, e.g., by means of computer tomography (CT), to determine the location of a tissue change in the body or in a body part prior to undergoing surgery or radiotherapy. During this, markers or emphasized points on the body part are included in the scan, the positional data of which is used later in a surgical navigation system, which monitors the treatment room during the operation in order to assist the surgeon or radiotherapist.

2. Description of Related Art

Disadvantageously, in such methods, a complicated assignment of the positional data from the CT scan to the three-dimensional data in the operating room with the aid of the navigation system must occur prior to treatment. On the one hand, this assignment is time-consuming since corresponding markers need to be applied manually to the skin, accessed by a referencing device, and identified. On the other hand, the assignment is quite often inaccurate, since, for example, skin markers may move slightly out of place in the course of the referencing procedure. Automatic referencing procedures using markers or by means of natural landmarks are highly computing-intensive.

Another disadvantage of such methods for assigning location and shape is that they do not necessarily reproduce the precise actual location data for the outer shape or inner shape at the time of treatment or operation, the shape data stemming namely from a CT scan implemented, for example, some time before the operation and only the mapped positions of the markers are updated. The position of tissue points relative to the markers may change due to shifting from the time taken to furnish the CT scan data to the operating room, with the result that the detected shape and location in the navigation system is incorrect and may lead to inaccurate treatment.

SUMMARY OF THE INVENTION

The present invention aims to provide a method and apparatus for detecting the shape of an object, which is capable of overcoming the aforementioned disadvantages of the prior art, and further to provide a method and apparatus that can map and/or update the shape of an object quickly and precisely.

In accordance with the invention, a method of detecting the shape of an object comprises the steps of:

a) producing a camera image of the object;

b) mapping an outline of the object, which appears sharp in the camera image, in a first plane by means of an analyzer connected to the camera;

c) altering the focusing distance of the camera;

d) mapping a sharp outline of the object in a second plane by means of the analyzer;

e) repeating steps b) to d) until a sufficient number of outlines has been mapped so that the three-dimensional shape of the object can be established.

This method in accordance with the invention has the great advantage that it may be performed automatically and very quickly. Once the method has been implemented, the outer shape of the object is exact and, above all, updated so that subsequent referencings can be likewise implemented with high accuracy. This shortens the time needed to prepare for a operation, especially a medical operation in the field of surgical and radiotherapeutical treatment, simplifies preparations for the operation and enhances accuracy in treatment, thus preventing errors in operations.

In a preferred embodiment of the invention, differences in contrast are mapped to establish which outline appears sharp in the camera image. When in the analyzer it is now known which focusing distance exists, then in this range, namely in the range of greatest sharpness of the image, also the differences in contrast are the greatest. Accordingly, the required outline is the one in which the differences in contrast are at a maximum and its distance, i.e., the location of the plane in which it is located remote from the camera, is known so that on this plane a definite outline assignment can be made. It is also possible, for example, to temporarily vary the focusing distance in mapping an outline at a plane to determine the greatest differences in contrast, and thus the precise location of the wanted plane, by averaging.

When the foregoing is done for a sufficient number of planes and outlines in these planes, a very accurate mapping of the shape of the object can be obtained.

A particularly precise detection of the outline may be achieved using a video camera having a very small depth of sharpness. A very small depth of sharpness ensures that a sharp outline appears only in a very limited range around the focusing distance of the camera. Thus, theoretically, the exact distance of the plane, in which the detected outline is located, could be sensed by a depth of sharpness approaching zero. Therefore, very accurate detections can be conducted with very small depths of sharpness.

In accordance with the invention, markers may be applied to the object to be mapped to highlight specific points on the object for identification. These may be light marks, mounted markers or affixed patterns, which simplify, for example, the detection of the sharpest image or the best contrast differences.

The analyzer preferably is a computer, including an image processing program, in which analog image signals, captured by the camera, are digitized (by an analog-to-digital converter) and then processed.

A particularly advantageous embodiment of the invention is achieved when the camera is that of a surgical microscope. In large magnifications, the depth of sharpness is smaller, meaning that the above noted advantages in this context are achievable. In the field of medicine, and in combination with a navigation system, the present invention may find application in two ways. On the one hand, the shape of a patient body part to be treated can be mapped as the object, the mapped shape being processed by a navigation system monitoring the treatment room, in order to incorporate the outer shape of the body part in the navigation. On the other hand, it is possible to apply at least one marker, detectable by the navigation system, to the object so as to also use the marker position as captured by the camera to assign the location and shape of the object to the navigation system.

Of course, a combination of natural landmarks and artificial markers may also be used for location assignment in the navigation system.

In accordance with an embodiment of the invention, when a natural landmark is used for assignment, at least one point (for example the nose root of a patient), detectable by the navigation system, is selected to assign the location and shape of the object to the navigation system via the position of this/these point(s) as also detected by the camera.

A method according to the invention may be used to verify and update the desired positional data together with a navigation system for referencing a location, i.e., preferably in radiotherapy or surgery. This enhances the accuracy of the treatment.

Advantageously, for this, the mapped shape of a body part is assigned to that shape determined by a preoperative scan, e.g., a computer tomography or a nuclear spin tomography, so that even when there has been a change in position during transport of the patient, i.e., the CT or nuclear spin tomography positional data are no longer totally correct, compensation and location correction can be implemented, this, in turn, preventing errors during the operation. A major advantage in this respect is that the mapping procedure in accordance with the invention may be undertaken also during the operation itself, i.e., during surgery on the open body part. The outlines in the created body opening may also be mapped and used to compensate the scanned image. The parts, already removed, can be cut out of the image furnished by the navigation system to ensure better and more updated assistance for the operating surgeon. In the process, density values, for instance, are created in each case, which precisely correspond to the new surface.

In addition, the invention provides a method that may also be used to provide an intelligent autofocus. For this purpose, the mapped shape of the object, already present in the analyzer, is used to automatically focus points or planes of the object as defined by the user. The user may enter in his navigation system, for example, the outline plane in which he wishes to receive a sharp image, e.g., by entering the coordinates or by using a tactile display. The camera can then precisely focus this outline plane.

It is furthermore possible by means of a method according to the present invention to obtain a "super sharp image" or an "infinitely sharp image". The mapped object shape may also be used to produce an image which is sharp at any depth. For this purpose, the sharp portion (contour)—e.g., a ring 2 to 3 mm wide—is extracted from each image and compounded with the other sharp portions from other focusing planes into an entire image.

Generally in this context, objects may be imaged from various sides by a method in accordance with the invention, whereby assigning the two mappings occurs computed either via a precisely known new camera position or via the assignment of artificial markers or natural landmarks so that an entire image is achieved. This also avoids problems resulting from undercuts on the object, and mapping may be completed.

An apparatus in accordance with the invention for detecting the shape of an object comprises a camera, including means for changing the focusing distance automatically or by manual access. Furthermore, it includes an analyzer, connected to the camera, which maps the sharp appearing outlines of the object in various focussing distances or planes in sequence until a sufficient number of outlines has been mapped so that the three-dimensional shape of the object can be established.

As already mentioned above, it is of advantage in this context when the camera is a video camera (digital or analog) having a very small depth of sharpness. As likewise already explained above, the analyzer is preferably a computer, including an image processing program, in which digital image signals are processed, or analog image signals, captured by the camera, are digitized and then processed, and wherein the image processing program determines which outline is sharp in the camera image, in particular by mapping the differences in contrast. The camera is preferably that on a surgical microscope.

BRIEF DESCRIPTION OF THE DRAWING

The invention will now be detailed by way of a preferred embodiment with reference to the attached drawing.

The drawing is a schematic representation of an apparatus in accordance with the invention for detecting the shape of an object. In the example shown, the microscope 3, depicted simplified, bears a camera 1 which, in this case, is a video camera having a very small depth of sharpness.

DETAILED DESCRIPTION OF THE PREFERRED EMBODIMENT

Figure 1:
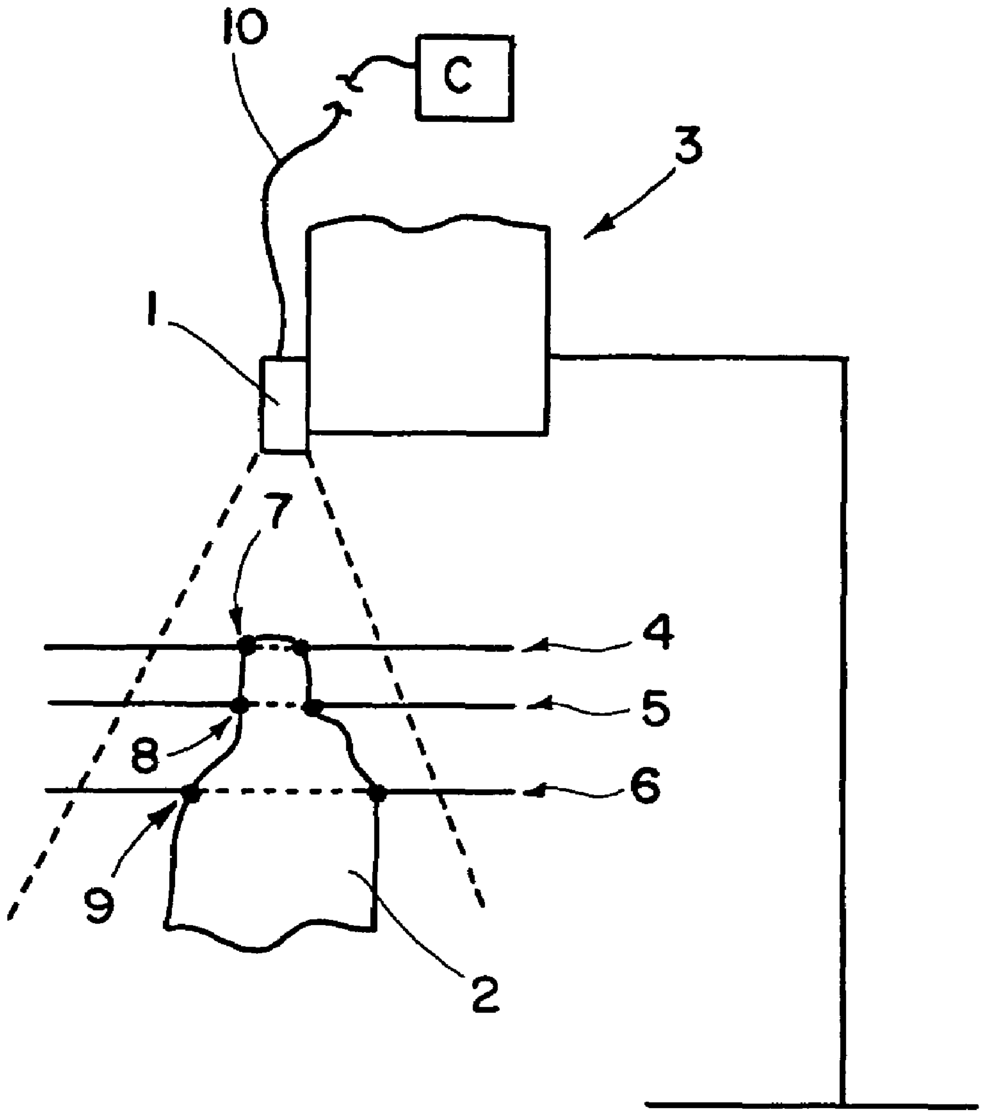

The video camera 1 produces a camera image of the object 2 in the imaging range as represented by the broken line.

The object 2 has an irregular outer shape. To detect the shape of the object 2, now, for example, one plane after the other is set sharp from the top down by the changing, more particularly by automatically changing the focussing distance of the camera 1. In the drawing, three planes 4, 5 and 6 are shown by way of example, each of which is accessed in sequence. Of course, in reality a far greater number of planes is accessed in mapping the shape, i.e., as many as is required to precisely map the shape of the object. Where highly complicated object shapes are involved, the number of focussing planes may also be automatically increased in defined distance ranges.

In accessing the planes 4, 5 and 6, as shown in the Figure, an outline of the object appears sharp in each case, this outline being represented in the drawing for the corresponding planes dotted in projection. The outermost points are identified on the left for each plane by 7, 8 and 9 and depicted somewhat amplified. When the camera 1 automatically sets its focussing distance, for example, to the plane 4, all points 7 on the object 2 in this plane appear sharp, and now the outline of the object 2 can be determined in the plane 4 from these sharp points. For this purpose, the image data are transferred from the camera 1 via a data line 10 to a computer C, which digitizes the analog image signals and establishes the outline data by means of an image processing program.

When this procedure is repeated for further planes, e.g., planes 5 and 6, in most cases, however, also for many intermediary planes, the shape of the object 2 can be detected precisely and updated.

In the foregoing description, preferred embodiments of the invention have been presented for the purpose of illustration and description. They are not intended to be exhaustive or to limit the invention to the precise form disclosed. Obvious modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

What is claimed is:

1. A method of detecting the three-dimensional shape of a patient body part to be treated, said method comprising the following steps:

a) producing a camera image of the patient body part;

b) mapping an outline of the patient body part, said outline appearing sharp in the camera image, in a first plane by means of an analyzer connected to the camera;

c) altering the focusing distance of the camera;

d) mapping a sharp outline of the patient body part in a second plane by means of the analyzer; and e) repeating steps b) to d) until a sufficient number of outlines has been mapped so that the three-dimensional shape of the patient body part can be established; and wherein the detected three-dimensional shape of the patient body part to be treated is used together with a navigation system for location referencing in radiotherapy methods or surgical operations.

2. The method as set forth in claim 1, wherein differences in contrast are mapped to establish which outline appears sharpened in said camera image.

3. The method as set forth in claim 1, wherein said camera is a video camera having a very small depth of sharpness.

4. The method as set forth in claim 1, wherein markers are applied to the patient body part to highlight specific points on the patient body part for identification.

5. The method as set forth in claim 1, wherein said analyzer used is a computer including an image processing program, in which digital image signals are processed, or analog image signals captured by said camera are digitized and then processed.

6. The method as set forth in claim 1, wherein a camera is used on a surgical microscope.

7. The method as set forth in claim 1, wherein at least one fixed point, detectable by a navigation system, is selected on the patient body part to assign the location and shape of the mapped three-dimensional patient body part in said navigation system based on the position of said at least one point as also captured by the camera.

8. The method as set forth in claim 1, wherein the mapped shape of the patient body part is assigned to a shape determined by a preoperative or intraoperative scan to permit compensation or location correction.

9. The method as set forth in claim 1, wherein the mapped shape of the patient body part is used to automatically focus object points or planes defined by a user.

10. The method as set forth in claim 1, wherein the mapped shape of the patient body part is used to produce an image which is sharp at any depth.

11. The method as set forth in claim 1, further comprising:

processing the mapped three-dimensional shape of the patient body part with a navigation system to incorporate the three-dimensional shape of the patient body part in navigation.

12. A method of detecting the shape of a patient body part to be treated, said method comprising the following steps:

a) applying at least one marker to the patient body part, said at least one marker being detectable by a navigation system;

b) producing a camera image of the patient body part;

c) mapping an outline of the patient body part, said outline appearing sharp in the camera image, in a first plane by means of an analyzer connected to the camera;

d) altering the focusing distance of the camera;

e) mapping a sharp outline of the patient body part in a second plane by means of the analyzer, f) repeating steps c) to e) until a sufficient number of outlines has been mapped so that the three-dimensional shape of the patient body part can be established;

g) assigning a location and shape of the mapped three-dimensional patient body part in the navigation system, said assigning being performed based on a position of the at least one marker captured by the camera; and h) processing the mapped shape of the patient body part with the navigation system to incorporate the three-dimensional shape of the patient body part in navigation.

* * * * *